(12) United States Patent
Larue et al.

(10) Patent No.: US 8,991,323 B2
(45) Date of Patent: Mar. 31, 2015

(54) BLADED COAL DIFFUSER AND COAL LINE BALANCING DEVICE

(75) Inventors: Albert D. Larue, Uniontown, OH (US); Leonard D. Hazlett, Hartville, OH (US); Kurt S. Titmas, Hudson, OH (US); Zumao Chen, Copley, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 871 days.

(21) Appl. No.: 12/614,480

(22) Filed: Nov. 9, 2009

(65) Prior Publication Data

US 2010/0123027 A1    May 20, 2010

Related U.S. Application Data

(60) Provisional application No. 61/114,501, filed on Nov. 14, 2008.

(51) Int. Cl.
*F23D 1/00* (2006.01)
*F23K 3/02* (2006.01)

(52) U.S. Cl.
CPC ... *F23D 1/00* (2013.01); *F23K 3/02* (2013.01); *F23D 2201/10* (2013.01); *F23D 2201/20* (2013.01); *F23D 2202/00* (2013.01); *F23D 2900/00018* (2013.01)
USPC ..................................... 110/260

(58) Field of Classification Search
CPC ... F23D 2201/20; F23D 2201/30; F23K 3/02; F23K 2203/201; F23K 2203/101; F23K 2203/008; F16L 57/06; F15D 1/04; F24F 13/081

USPC ............. 110/261, 263, 264, 347, 106, 104 B; 285/179; 403/205
See application file for complete search history.

(56) References Cited

U.S. PATENT DOCUMENTS

| 4,027,605 A | * | 6/1977 | Legille ........................ 110/182.5 |
| 4,380,202 A | | 4/1983 | LaRue et al. |
| 4,934,284 A | * | 6/1990 | Nitz et al. ...................... 110/263 |
| 5,131,334 A | | 7/1992 | Monro |
| 5,526,758 A | * | 6/1996 | Giammaruti et al. ......... 110/263 |
| 5,529,000 A | | 6/1996 | Hartel et al. |
| 5,588,380 A | * | 12/1996 | LaRose .......................... 110/263 |
| 5,605,103 A | * | 2/1997 | LaRue .......................... 110/262 |

(Continued)

FOREIGN PATENT DOCUMENTS

| CN | 1162717 A | 10/1977 |
| CN | 1271826 A | 11/2000 |

(Continued)

OTHER PUBLICATIONS

Extended European Search Report (EESR) dated Apr. 7, 2011.

(Continued)

*Primary Examiner* — David J Laux
(74) *Attorney, Agent, or Firm* — Michael J. Seymour; Christopher L. Smith; Eric Marich (57) ABSTRACT

A coal nozzle assembly for a pulverized coal burner includes a diffuser. A flow conditioner also may be used with the assembly. The assembly conditions the coal/air flow before the coal/air flow is introduced to the furnace. The flow conditioner directs the coal into the diffuser where it is swirled to form a fuel rich outer ring disposed about an air rich inner portion before the fuel is delivered to the coal nozzle.

25 Claims, 8 Drawing Sheets

(56) References Cited

U.S. PATENT DOCUMENTS

| | | | |
|---|---|---|---|
| 5,685,242 A | 11/1997 | Narato et al. | |
| 6,055,913 A * | 5/2000 | Gerber et al. | 110/104 B |
| 6,058,855 A | 5/2000 | Ake et al. | |
| 6,152,051 A * | 11/2000 | Kiyama et al. | 110/262 |
| 7,739,967 B2 * | 6/2010 | Briggs et al. | 110/261 |
| 8,104,412 B2 * | 1/2012 | Zarnescu et al. | 110/263 |
| 8,251,088 B2 * | 8/2012 | Wark | 110/264 |
| 2006/0029895 A1 | 2/2006 | Vatsky | |

FOREIGN PATENT DOCUMENTS

| | | |
|---|---|---|
| CN | 101140065 A | 3/2008 |
| DE | 436812 C | 11/1926 |
| EP | 0670454 A1 | 9/1995 |
| EP | 0672863 A2 | 9/1995 |
| EP | 1845308 A2 | 10/2007 |
| FR | 2773388 A1 | 7/1999 |
| TW | M265563 | 5/2005 |

OTHER PUBLICATIONS

New Zealand Examination Report dated Nov. 20, 2009.
Chinese Notice on the First Office Action dated Feb. 4, 2013.
Chinese Notice on the Second Office Action dated Jul. 11, 2013.
TW Office Action and Search Report (860721), Application No. 098138400, Apr. 28, 2014.
TW Decision of Rejection (860721), Application No. 098138400, 2014.

* cited by examiner

Particle Flux (kg/m²s)
- 30
- 24
- 16
- 8
- 0

| 94 in from Exit | 71 in from Exit | 41 in from Exit | Pipe Exit |
|---|---|---|---|
| FIG. 3B PRIOR ART | FIG. 3C PRIOR ART | FIG. 3D PRIOR ART | FIG. 3E PRIOR ART |

Gravity ↓

Particle Flux (kg/m²s)

Analysis of Particle Flux within a Coal Nozzle
(Prior Art Impeller Design)

Particle Flux (kg/m²s)

Analysis of Particle Flux within a Coal Nozzle
(Adjustable deflector open 100%)

Particle Flux (kg/m²s)

Analysis of Particle Flux within a Coal Nozzle
(Adjustable deflector closed 100%)

FIG. 9A

BLADED COAL DIFFUSER AND COAL LINE BALANCING DEVICE

CROSS REFERENCE TO RELATED APPLICATIONS

This application claims the benefit of U.S. Provisional Patent Application Ser. No. 61/114,501 filed Nov. 14, 2008; the disclosures of which are incorporated herein by reference.

FIELD OF INVENTION

The present invention concerns improvements in the field of low nitrogen oxide (NOx) pulverized coal fired burners. More particularly, the invention relates to the coal nozzle assembly that conditions the pulverized coal/primary air stream prior to combustion.

BACKGROUND OF THE INVENTION

Figure 1:
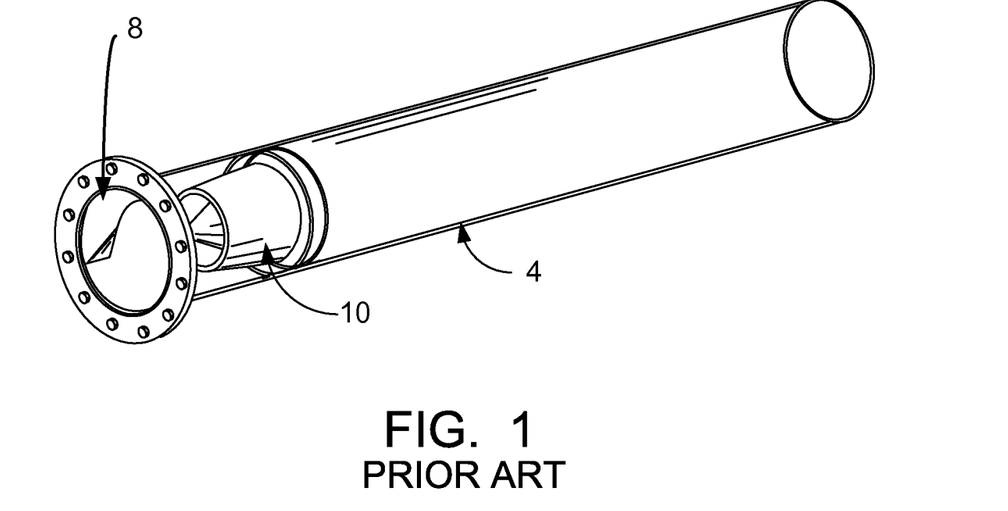
FIG. 1 is a perspective view of a prior art coal nozzle assembly having the prior art conical diffuser.

Low NOx coal fired burners employ various types of hardware in the burner nozzles to alter the primary air/pulverized coal (PA/PC) stream before entering the burner throat for initiation of combustion. These devices are designed to enhance fuel/air mixing to better control NOx emissions. U.S. Pat. No. 4,380,202 discloses a conical diffuser 10 (an example of which is depicted in FIG. 1) that has been utilized in Babcock and Wilcox's DRB-XCL® and DRB-4Z® burners. The conical diffuser 10 is located near the entrance of the coal nozzle 4 downstream of an optional stationary deflector 8 located within the annuals of coal nozzle 4. The diffuser promotes the generation of a fuel rich ring of fuel near the walls of the coal nozzle 4 downstream of the conical diffuser 10, thereby promoting improvements in flame stability and lower NOx emissions. The conical diffuser 10 is typically constructed from ceramic materials to improve wear resistance.

Figure 2:
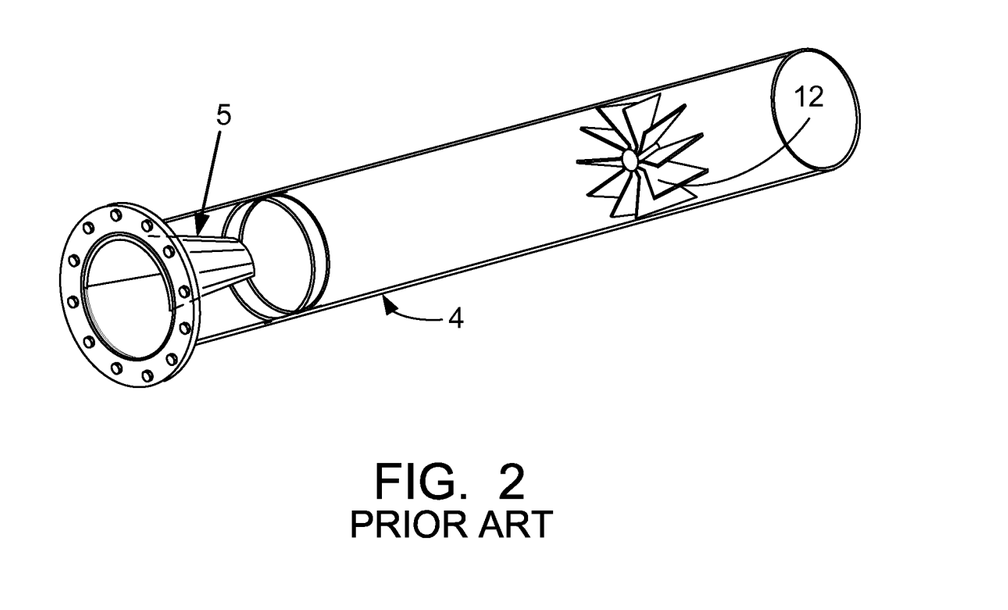
FIG. 2 is a perspective view of a prior art coal nozzle assembly having the prior art 15 degree impeller.

Combustion testing has demonstrated that an air-staged DRB-4Z® burner equipped with a distribution cone 5 located in the coal nozzle 4 and upstream of a standard bladed impeller 12 (see FIG. 2) produces lower NOx emissions than the same burner equipped with a conical diffuser. Testing with eastern bituminous coal has shown that a NOx reduction of about 17% can be achieved using a standard bladed impeller 12 when staged near 0.8 stoichiometry. Increased near field mixing under reducing conditions tends to favor lower NOx emissions. Field testing has also demonstrated lower NOx emissions are achieved with DRB-XCL® burners equipped with standard bladed impellers 12 compared to those equipped with conical diffusers 10 under certain staged conditions.

While standard bladed impellers 12 and similarly located mixing devices can offer functional NOx improvements, they generally suffer from erosion and high temperature related degradation. Achieving the intended mixing benefit of standard bladed impellers 12 generally requires placing the impellers at or near the exit of the burner coal within the coal nozzle 4. However, at these locations impellers readily reach high temperatures from radiative heat transfer from the furnace. These high temperatures are undesirable to impeller longevity as they can thermally erode metal components directly and/or cause coal to stick and cake upon the device causing additional unfavorable consequential damages.

Pulverized coal is highly abrasive, and erosion from pulverized coal is a consistent problem for burner component in direct contact therewith. While ceramics can minimize this effect and are frequently used to protect equipment from erosion, high temperatures near the exit of the burner coal nozzle 4 prevent the effective use of ceramics in such applications. When combined, erosion and exposure to high temperatures generally shorten component life of impellers and similarly located devices to typically about a year of effective service life, after which the burner experiences diminished performance until such time that the impeller is replaced. Standard impellers 12 and similarly located devices thus experience a limited effective service life in the power generation, requiring substantial expenditures (cost, material, labor, and outage time) to facilitate repeated replacements. A need thus exists to develop a diffuser impeller device of a lengthened service life to alleviate concerns associated with prior art impellers.

An additional concern of pulverized coal fired burners is the potential for non-uniform distribution of pulverized coal and primary air to multiple burners served by a given pulverizer. Such non-uniformities are due in part to differences in coal piping from the source (pulverizer) of a pulverized coal stream to each individual coal outlet (burner). Each burner, as provided within a given boiler/combustion facility, is located at a unique distance from the pulverizer that supplies the pulverized coal to the burner. Inherent in any given boiler facility are differences such as: lengths of coal piping runs, number of bends per each run, bend geometries, and in some cases a single mill or pulverizer can supply multiple elevations of burners. These factors combine to cause differences in flow resistance unique to each pipe, and thus each burner. To compensate for these differences, fixed orifices or similar devices are sometimes utilized in an effort to balance flow distribution through each of the coal pipes for each pulverizer. While helpful, such devices have inherent limitations making it not possible to provide sustainable uniform distribution.

Another technique is to apply adjustable flow resistors in the coal piping. Adjustable flow resistors provide the advantage of on-line adjustment for measured imbalances, with varying effectiveness. However, such devices are generally economically infeasible based on the need to supply a ceramic lined spool piece to house such a device. Further, installation costs provide an additional barrier to feasibility due to the need for coal piping alterations (cutting, addition of flanges), a lack of accessibility, and a need for new platforms etc. to install and maintain such equipment. A need thus exists for improved readily installable adjustable flow resistors.

Effective impeller designs must also take into consideration various characteristics of combustion such as flame length. Low NOx pulverized coal-fired burners tend to form long flames and produce higher levels of unburned combustibles relative to conventional burners. Long flames generally result from insufficient air supply to the fuel jet as it proceeds into the furnace. Secondary air from the outer air zones of low NOx burners does not effectively penetrate the fuel jet, such that uncombusted fuel persists along the flame axis. Many low NOx systems utilize over-fire air ports to burn out uncombusted fuel in a manner that inhibits NOx emissions via the well known principle of air staging.

Depending on a given furnace's dimensions (depth, height, etc. . . . ), excessively long flames can result in flame impingement, slagging, and corrosion of boiler tubes thus impairing the function of the burner. Longer burner flames may also unfavorably extend into portions of the furnace where overfire air is introduced through overfire air ports. In such instances the ability to control NOx formation is unfavorably inhibited as air supplied by the overfire air system can extend the flame beyond the over-fire air zone, thereby effectively merging multiple combustion stages and minimizing the benefits of stage combustion. Effective mixing of coal and air prior to combustion provides a degree of control over flame length. An industry need thus exists to provide a diffuser impeller of improved wear resistance; thereby enhancing controlled air/fuel mixing, and thus resulting flame and combustion characteristics, associated with an operative diffuser impeller.

SUMMARY OF THE INVENTION

The present invention provides a coal nozzle assembly for a pulverized coal burner, a diffuser that may be used with the assembly, and a flow conditioner that may be used with the assembly. The assembly of the present invention conditions the coal/air flow before the coal/air flow exits the burner.

In one configuration, the invention provides a ceramic diffuser located in the upstream end of the coal nozzle. The configuration of the diffuser allows the diffuser to be manufactured from ceramic and located in the cooler upstream end of the coal nozzle. The ceramic diffuser may have a body with a tapered upstream portion and a plurality of blades extending outwardly from the body. The blades are angled with respect to the longitudinal direction of the coal nozzle such that a coal and air flow passing through the diffuser may be selectively swirled.

In another configuration, the invention provides a diffuser for a coal nozzle wherein the tapered upstream end of the diffuser body is blunt so that a pulverized coal stream engaging the blunt upstream end of the diffuser will be broken apart and directed relatively evenly between the pluralities of blades.

In a different configuration, the invention provides a diffuser for a coal nozzle wherein the body of the diffuser includes a tapered upstream end and a downstream portion with blades extending outwardly from both the upstream end and the downstream portion.

The invention also provides an adjustable flow conditioner for a burner elbow wherein the flow conditioner includes a fixed portion and an adjustable portion.

Another configuration of the invention provides a coal nozzle assembly for a pulverized coal burner. The assembly includes a coal nozzle having an upstream inlet and a downstream outlet; the coal nozzle having a wall having an inner surface; a burner elbow disposed upstream of the upstream inlet; a diffuser positioned in the coal nozzle closer to the upstream inlet than the downstream outlet; the diffuser having a body with a tapered upstream portion; the diffuser having a plurality of blades extending outwardly from the body; the blades being adapted to spin a flow of air and coal; and an adjustable flow conditioner carried by the burner elbow; the adjustable flow conditioner having a fixed portion and an moveable portion; the fixed portion being adapted to direct a pulverized coal stream into the tapered upstream portion of the diffuser and the moveable portion being selectively movable to adjust the pressure drop across the burner elbow.

BRIEF DESCRIPTION OF THE DRAWINGS

It shall be understood that similar numerals as used herein shall refer to similar elements throughout the specification.

DETAILED DESCRIPTION OF ILLUSTRATIVE EMBODIMENT

A coal nozzle assembly 102 for a pulverized coal burner includes a coal nozzle or coal nozzle pipe 104 and a burner elbow 106. Coal nozzle assembly 102 conditions the primary air/pulverized coal stream before dispensing it to the furnace. Coal nozzle assembly 102 may be used to accomplish rapid mixing of pulverized coal and secondary air in a burner to accelerate the combustion of the pulverized coal under reducing conditions in an air staged unit. The accelerated combustion oxidizes the fuel more rapidly in the burner zone to the extent air is available. The accelerated combustion provides more time for the flue gas to complete the combustion under reducing conditions before the balance of air is supplied by the over fire air system. The increased residence time under reducing conditions decreases the amount of NOx formed in the burner zone. Further, more complete combustion in the burner zone limits the amount of remaining fuel needed to burn at and above the over fire air ports, thereby lowering the unburned combustibles leaving the furnace and improving efficiency. Accelerated combustion is further desirable as it serves to shorten and widen the flame envelope; reducing flame impingement for single wall fired boilers and mitigating the formation of longer flames capable of extending into the over fire air zone.

Coal nozzle assembly 102 includes a diffuser 110 located in the cooler upstream portion of coal nozzle 104. In the context of the present invention, the upstream portion of coal nozzle 104 is readily defined as the ceramic lined portion of the coal nozzle 104, which is generally inclusive of the half of nozzle 104 that is closest to the inlet 112 of nozzle 104. In the exemplary configuration of assembly 102 depicted in FIG. 4, diffuser 110 is located one quarter of the nozzle length (defined between inlet end 112 and the outlet end 114) from inlet end 112. In other configurations, diffuser 110 may be located from between about zero to about 2 coal nozzle diameters away from nozzle inlet end 112. Diffuser 110 is configured to condition the primary air/pulverized coal stream into an elongated tube having a high concentration of pulverized coal disposed around a primary air-rich center. Once the pulverized coal leaves nozzle 104 at the nozzle exit 114, it will continue to flare in an outward motion causing it to mix with the secondary air streams and increase the rate of combustion. The location of diffuser 110 in the nozzle 104 allows diffuser 110 to be fabricated from a ceramic material to provide diffuser 110 with more desirable wear properties.

Figure 4:
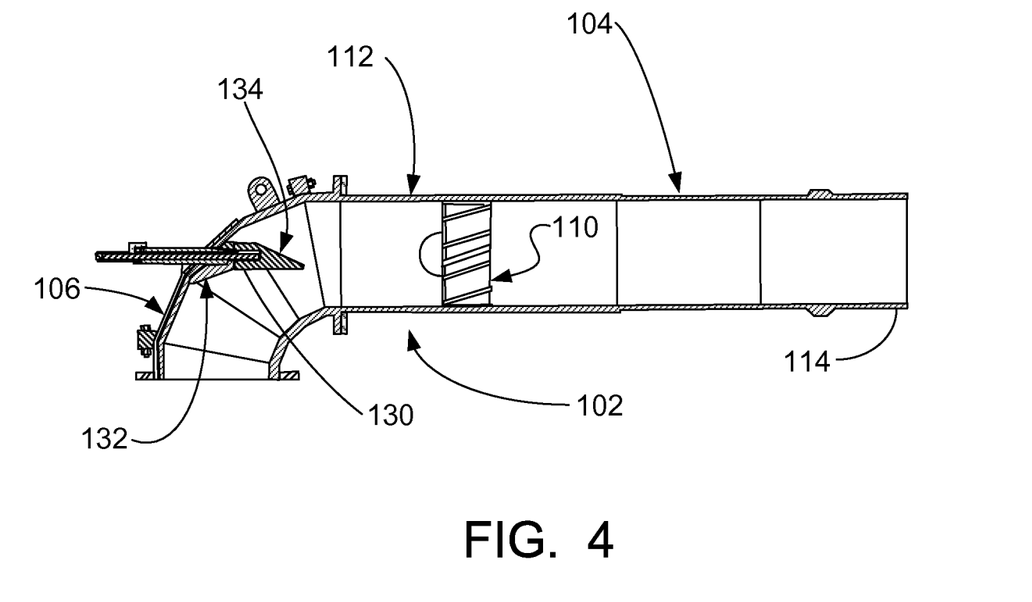
FIG. 4 is a longitudinal section view of a coal nozzle assembly according to one exemplary configuration of the present invention.

Diffuser 110 imparts a spin or a swirl on the primary air/pulverized coal stream in the upstream portion of coal nozzle 104. Diffuser 110 encourages the spinning flow to persist from the location of diffuser 110 to the exit 114 of coal nozzle 104 and into the furnace. Diffuser 110 is configured to generate a downstream fuel configuration that is air rich in the center and fuel rich near the inner surface of the coal nozzle 104. In addition to its location in coal nozzle 104, diffuser 110 achieves the desired fuel/air distribution using a tapered upstream body portion or nose 120 combined with a plurality of blades 122 that extend from a downstream body portion 124. In addition to these factors, the distribution of the fuel and air within coal nozzle 104 is influenced by flow conditioning in elbow 106. A flow conditioner 130 may be provided in burner elbow 106 to redirect pulverized coal flow (generally in the form of an elongated stream/helical coil or a "coal rope") formed along the outer radius of elbow 106 by centrifugal forces. Flow conditioner 130 may be used to direct the coal rope into upstream body portion 120 of diffuser 110 where the pulverized coal flow is broken apart and distributed directly against blades 122, wherein the fuel is redirected into a swirling pattern that results in the desired fuel distribution pattern.

Figure 6:
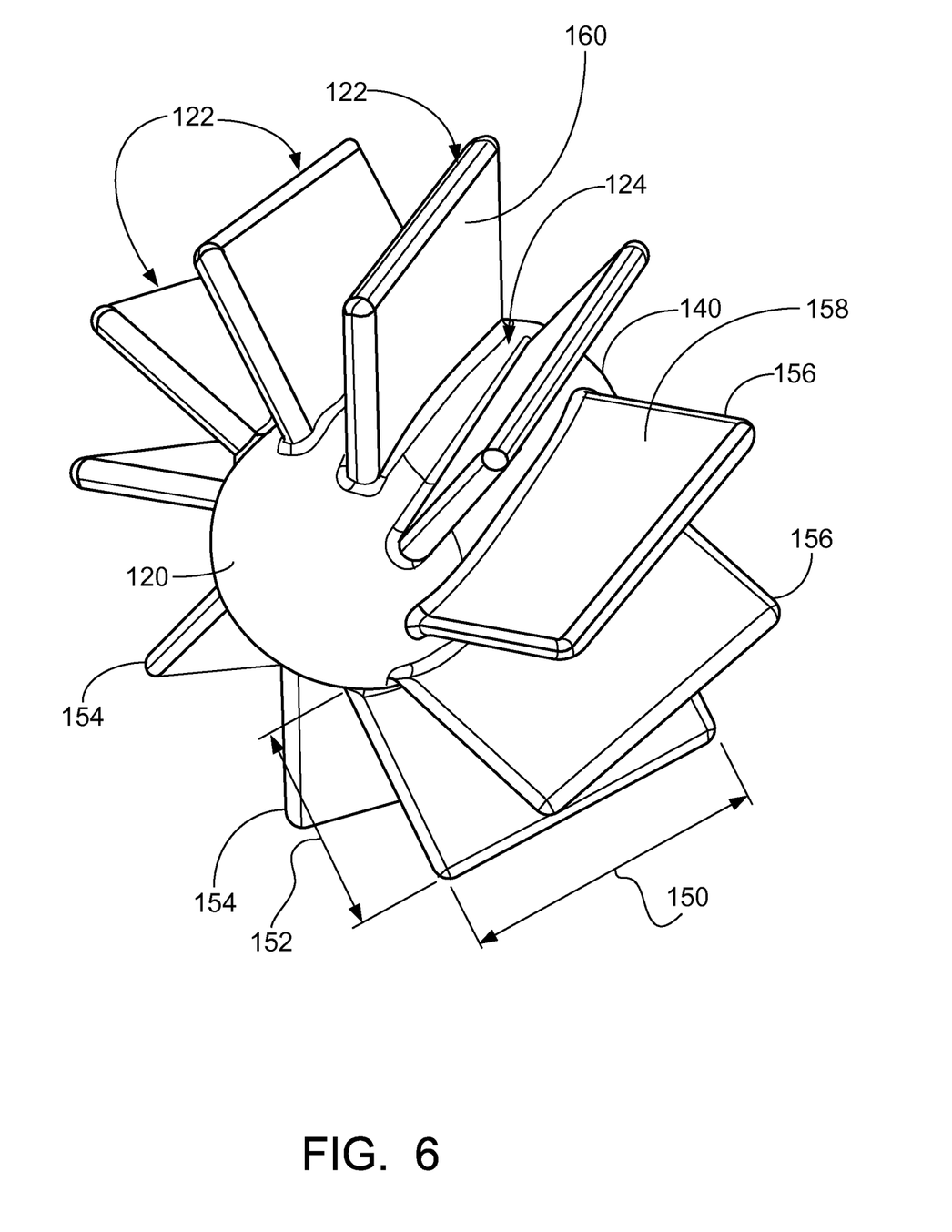
FIG. 6 is a perspective view of an exemplary configuration of a diffuser used with the coal nozzle assembly.
Figure 7A:
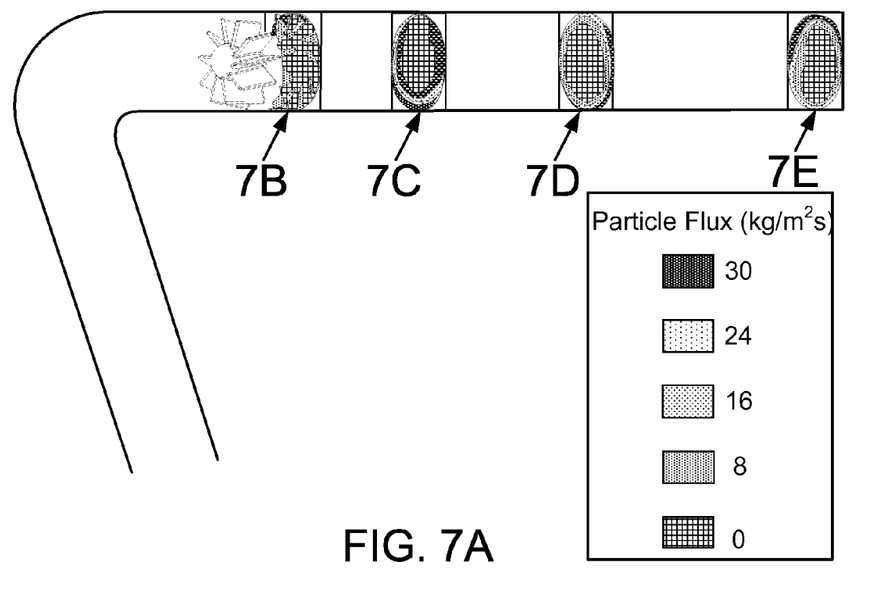
FIGS. 7A-7E are schematic views showing the particle flux of primary air/pulverized coal at locations along the coal nozzle assembly of FIG. 4 with the adjustable deflector 100 percent open.
Figure 7B:
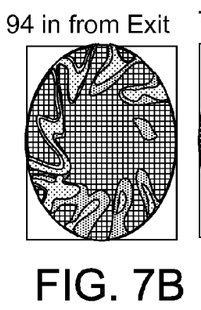
Figure 7C:
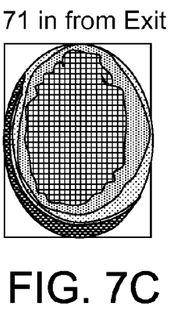
Figure 7D:
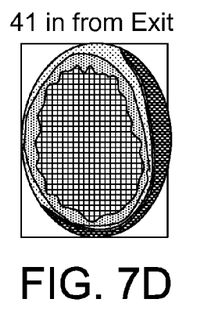
Figure 7E:
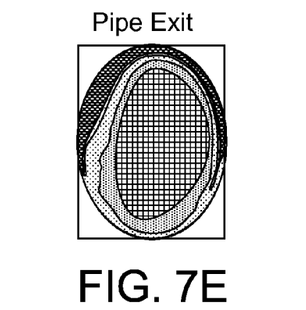
Figure 8A:
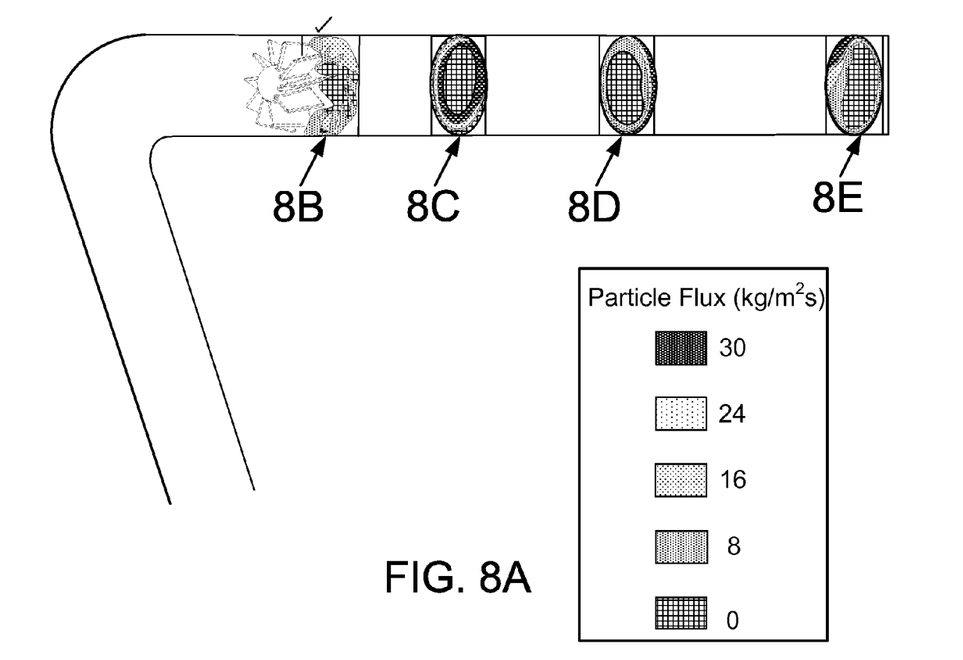
FIGS. 8A-8E are schematic views showing the particle flux of primary air/pulverized coal at locations along the coal nozzle assembly of FIG. 4 with the adjustable deflector 100 percent closed.
Figure 8B:
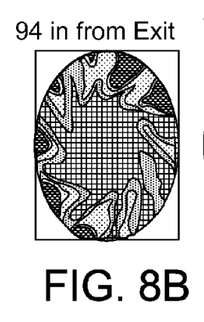
Figure 8C:
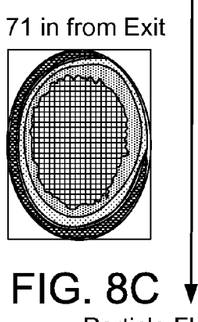
Figure 8D:
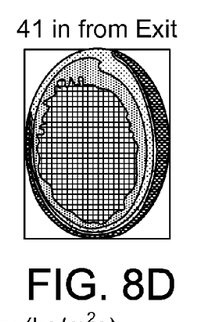
Figure 8E:
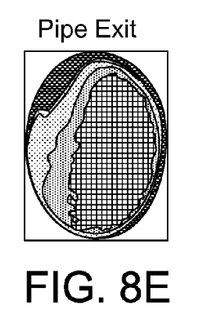

As introduced above and shown in FIGS. 4 and 6, diffuser 110 includes a body having an upstream body portion or nose 120 disposed in front of a central downstream body portion 124. Nose 120 may blend smoothly or seamlessly into the front of downstream body portion 124 so that there are substantially no interruptions that disrupt the flow of coal and air. Nose 120 is tapered from a small upstream end towards a larger downstream end. Nose 120 may incorporate different shapes. In a preferred embodiment nose 120 is of a semi-spherical or elongated semi-spherical shape wherein the diameter of the sphere is the widest portion of the bullet nose. In alternative embodiments, oval, conical, pyramidal and elongated taped oval shapes may be utilized. In the exemplary configuration depicted in the drawings, nose 120 defines a portion of a sphere having an outer diameter about one third of the inner diameter of coal nozzle 104. In an alternative embodiment, the diameter of the bullet nozzle is preferably between about 15 to about 20 percent of the coal nozzle diameter.

The majority of downstream body portion 124 may be in the form of a right-cylinder having an outer diameter substantially equal to the outer diameter of nose 120. Nose 120 and downstream body portion 124 may be integrally formed. The downstream end 140 of downstream body portion 124 may taper to a more narrow diameter so as to not create a sharp change that would interfere with the flow of air and fuel. The narrowed diameter of downstream end 140 may be between about 100% and 10 percent of the outer diameter of the body portion. In another configuration of diffuser 110, downstream body portion 124 may be tapered itself with its upstream and downstream ends having smaller diameters than its middle portion so that trunk 124 resembles a barrel.

A plurality of blades 122 extend outwardly from the body of diffuser 110. Blades 122 may be disposed at an angle to the longitudinal direction of coal nozzle 104 (which is generally parallel to the flow direction of the fuel in the cold end of coal nozzle 104) so that a spin or swirl is imparted to the fuel as it moves through diffuser 110. Blades 122 are configured to impart an outwardly directed force to the coal particles so that they move toward the inner surface of coal nozzle 104 as they move across blades 122 and after they leave diffuser 110. Blades 110 may be angled from zero to forty-five degrees with respect to the longitudinal direction of nozzle 104 when viewed from the front of diffuser 110. Lesser pitch angles are believed to function well with un-staged units, as this reduces the mixing energy with the secondary air to help reduce NOx emissions while still creating an air rich center and fuel rich outer annulus.

Although ten blades 122 are shown in the exemplary configuration of FIG. 6, different numbers of blades 122 may be used. Other diffuser 110 configurations may have from four to fourteen blades 122. The number of blades 122 enables a degree of control over pressure drop through diffuser 110 and changes the mixing energy of the fuel with the secondary air once the coal particles leave coal nozzle 104. The number of blades 122 and the configuration of blades 122 thus may be adapted for specific applications and specific coal nozzle geometries and designs.

The longitudinal length 150 of each blade 122 is the dimension disposed generally along the flow direction. The radial length or height 152 of each blade 122 is generally in the radial direction of diffuser 110. The upstream end 154 of each blade 122 is tapered (rounded in the exemplary configuration) and the downstream end 156 of each blade 122 is also tapered (also rounded in the exemplary configuration). Each blade 122 is angled such that it defines an upstream impingement surface or upstream sidewall 158 that is directly impinged by the fuel flow and a downstream surface or downstream sidewall 160. The blade thickness is the distance between sidewalls 158 and 160 at any point of the blade. The thickness may be substantially constant such as when sidewalls 158 and 160 are flat and parallel (as shown in FIG. 6) or such as when sidewalls 158 and 160 are curved but parallel/concentric. The blade thickness may vary when sidewalls 158 and 160 are not parallel such as when the blade is in the form of an airfoil or a tapered thickness blade. In the exemplary configuration depicted in FIG. 6, blade sidewalls 158 and 160 are flat and parallel. Blades 122 that are spiraled in shape along the length of downstream body portion 124 (curved sidewalls rather than flat) may provide an acceleration to the coal particles through diffuser 110 thus increasing their mixing energy with the secondary air as the coal particles leave the coal nozzle. Blades 122 in the shape of airfoils may provide a way of creating more spin while not needing an aggressive blade angle to help reduce pressure drop.

Each blade 122 overlaps a portion of nose 120 such that each upstream end 154 is disposed upstream of downstream body portion 124 and downstream of the upstream end of nose 120. In the exemplary configuration of diffuser 110 shown in FIG. 6, blades 122 extend about one quarter of the nose length onto nose 120. This configuration provides that the coal being moved radially outwardly by nose 120 will engage blades 122 while the coal is still moving radially outwardly. Downstream end 156 is disposed upstream of downstream end 140 of downstream body portion 124

Figure 9A:
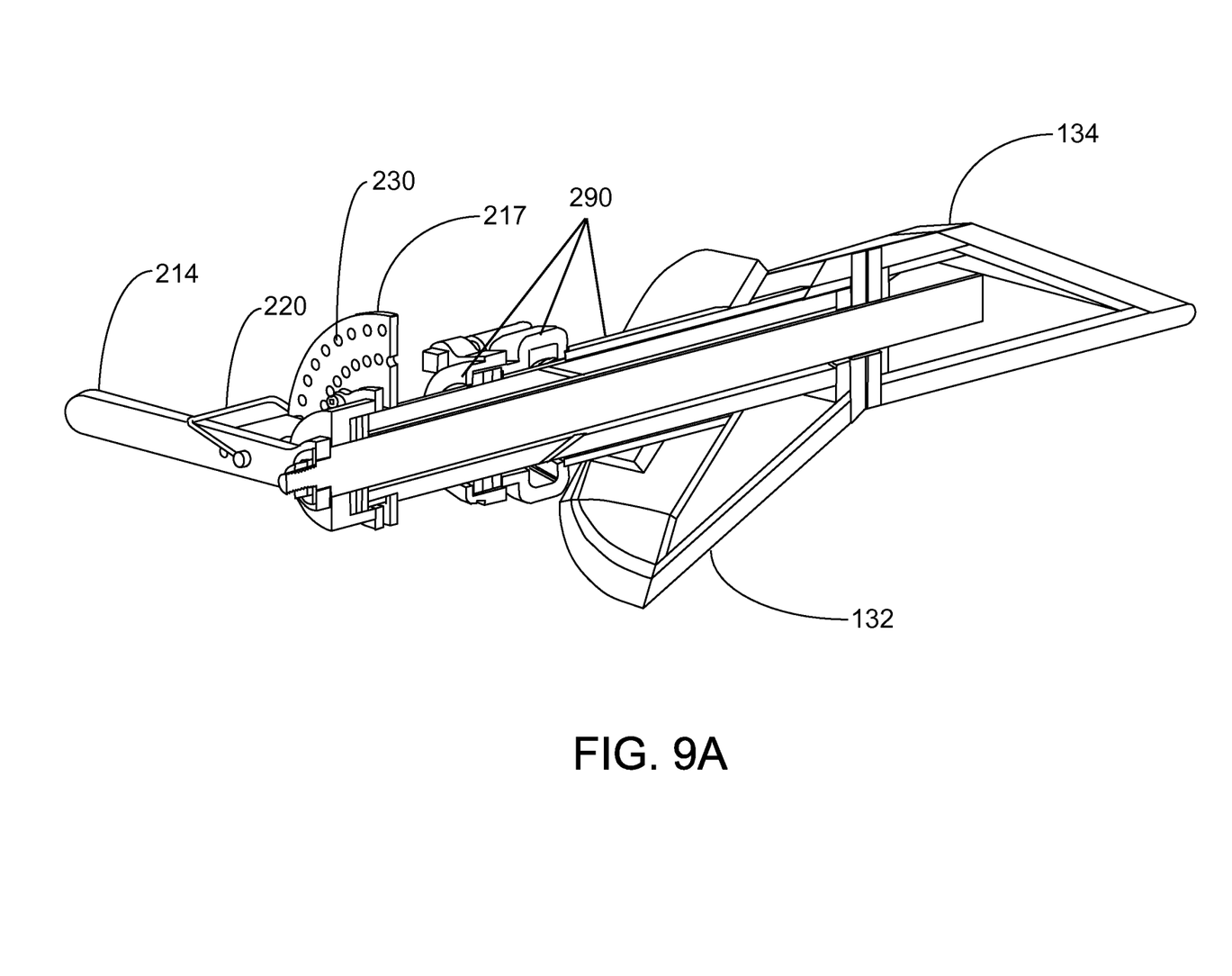
FIG. 9A is a first perspective cross sectional view of a coal deflector according to the present invention wherein the adjustable deflector is in a first position.
Figure 9B:
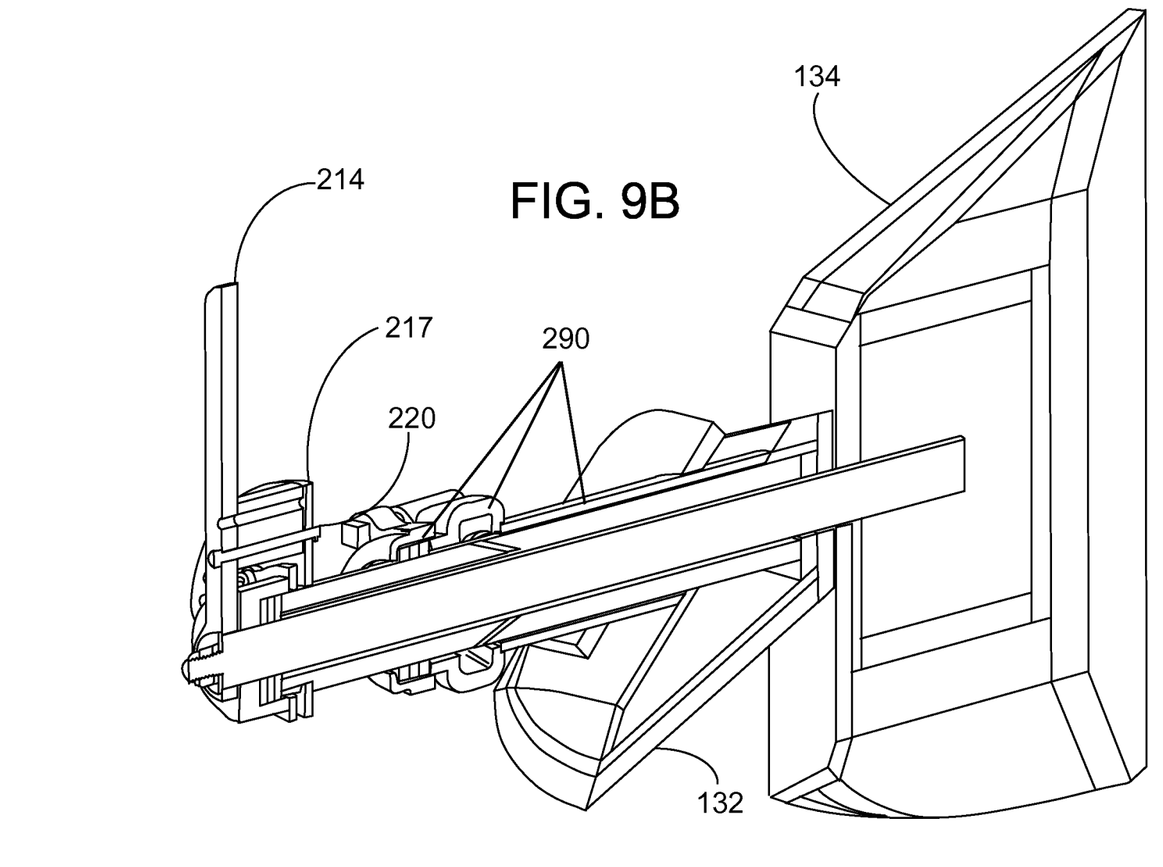
FIG. 9B is a second perspective cross sectional view of a coal deflector according to the present invention wherein the adjustable deflector is in a second position.

Flow conditioner 130 in burner elbow 106 is an adjustable device with a fixed portion 132 and a moveable portion 134. Fixed portion 132 of conditioner 130 is disposed against the outer portion of elbow 106 so that the coal rope that forms against or along the outer portion of elbow 106 is deflected out into the central portion of nozzle 104 where it collides with nose 120 of diffuser 110. Moveable portion 134 may be moved between a 100 percent open configuration wherein it has little influence on the flow (and induces little pressure drop) as shown in FIG. 9B wherein handle 214 is rotated to a fully open position on angle adjustment plate 217, and a 100 percent closed configuration wherein most of the incoming flow is influenced by conditioner 130 (and a larger pressure drop is created) as shown in FIG. 9A wherein handle 214 is rotated to a fully closed position on angle adjustment plate 217. Movable portion 134 may also be selectively positioned between a 100 percent open and 100 percent closed position wherein a securing mechanism 220 utilizes positioning orifices 230 to maintain a desired position of the movable portion 134 of the flow conditioner 130.

Conditioner 130 thus allows the pressure drop through assembly 102 to be adjusted. Adjusting the pressure drop through assembly 102 allows the delivery of primary air/pulverized coal flow to be adjusted. Unlike other adjustable devices in the coal piping, conditioner 130 is located in burner elbow 106 which is invariably accessible for installation and adjustment, thereby also greatly reducing installation expenses. Conditioner 130 may also be configured to readily mount into a burner elbow inspection port 290 to facilitate installation.

Figure 5:
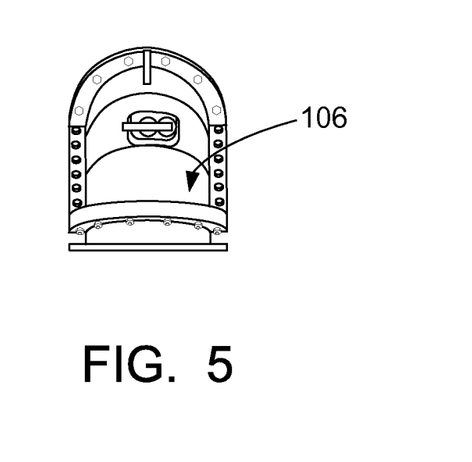
FIG. 5 is an end view of the exemplary coal nozzle assembly of FIG. 4.

Moveable portion 134 may be a flat plate or may have a sloped or curved upper surface as shown in FIG. 5 to help keep coal dust from accumulating on top of it and combusting. The size of portions 132 and 134 may be adjusted to allow for a greater or reduced pressure differential between the open and closed positions of conditioner 130.

For plants that already have adjustable orifices in their coal piping and do not need or otherwise want adjustable flow capability, a stationary wedge may be used to direct the coal rope into nose 120. The wedge may be used for both splash plate and segmented elbow applications.

In use, a coal rope comes off conditioner 130 and is directed toward nose 120 of diffuser 110. The coal rope fragments against nose 120 substantially equally dispersing it around nose 120 and through blades 122 thus creating an air rich center fuel pattern downstream of diffuser 110 within coal nozzle 104. Blades 122 are set at an angle which imparts a spin or swirling motion to the coal and air through coal nozzle 104 downstream of diffuser 110. The upstream location of diffuser 110 gives the coal time to move into an established pattern before being introduced into the burner. The spinning and swirling motion through coal nozzle 104 imparts centrifugal forces on the coal particles forcing them to outside perimeter of the coal nozzle creating a larger air rich center, with a fuel rich ring around the outside. FIGS. 7 and 8 depict a CFD (computational fluid dynamic) analysis of particle flux through coal nozzle assembly 102. Each drawing shows the fuel rich ring along the perimeter of the coal nozzle and the air rich center at different locations along nozzle 104.

Figure 3:
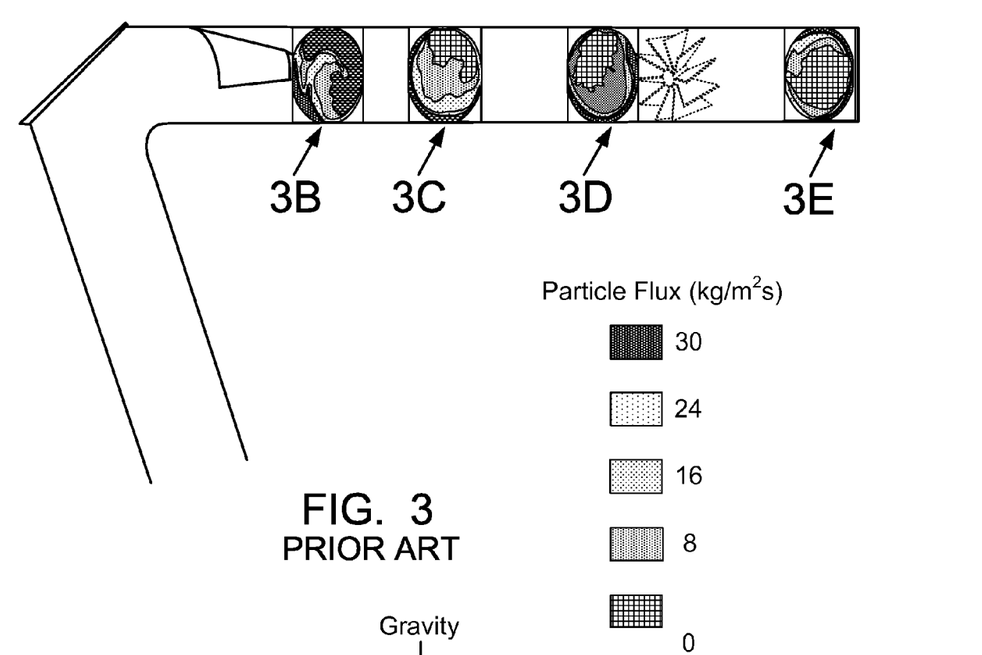
FIGS. 3A-3E are schematic views showing the particle flux of primary air/pulverized coal at locations along the prior art coal nozzle assembly of FIG. 2.
Figure 3B:
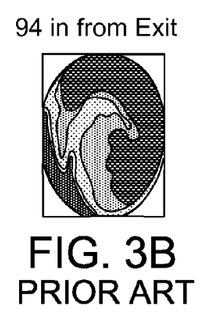
Figure 3C:
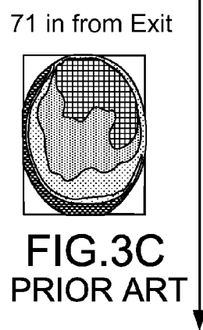
Figure 3D:
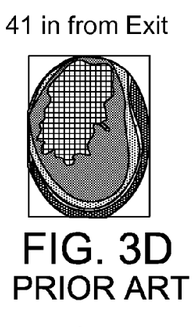
Figure 3E:
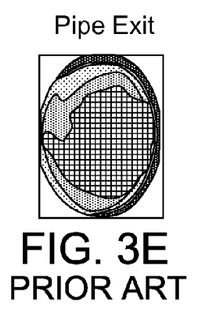

The results of a CFD (computational fluid dynamics) analysis shown in FIGS. 3, 7, and 8 show that the ratio of tangential momentum to the axial momentum of the coal particles is at least 18% higher with diffuser 110 than a prior art bladed impeller. The distribution of fuel in an annulus around the perimeter of coal nozzle 104 is more defined with a larger air rich center than compared to that of a standard bladed impeller.

A further advantage of the assembly 102 is that it also has the ability to bias coal flows to individual burners by way of conditioner 130 within burner elbow 106. Adjustable conditioner 130 can be used to vary coal flow to its burner through its ability to adjust pressure drop across burner elbow 106.

DRB-4Z® low NOx burners have been employed extensively in the utility boiler market and have a reputation for ruggedness and mechanical reliability. While the NOx emissions performance of the DRB-4Z® low NOx burner in a staged unit may be improved by adding a prior art bladed impeller such as that depicted in FIG. 2, mechanical reliability may suffer from the proximity of the bladed impeller to outlet end of nozzle 114. The configuration of diffuser 110 enables it to function as intended while being located in the upstream end of coal nozzle 104. This location, which is a much cooler environment as compared to the exit of the coal nozzle, enables constructing diffuser 110 from ceramic materials thereby greatly extending the wear life of diffuser 110.

While the conical diffuser embodiment of FIG. 6 portrays the blades 122 of a conical diffuser in a counter-clockwise configuration, it is understood that in alternative embodiments of the present invention, blades 122 may alternatively be position in a clockwise manner without departing from the teachings of the present invention.

While illustrative embodiments have been shown and described in detail, the invention may be embodied otherwise. The following claims should not be construed as being limited to the few embodiments set forth above.

That which is claimed is:

1. A coal nozzle assembly for a pulverized coal burner, the coal nozzle assembly comprising:
a coal nozzle having an upstream inlet and a downstream outlet and a longitudinal direction, the coal nozzle having a wall having an inner surface;
a diffuser positioned in the coal nozzle closer to the upstream inlet than the downstream outlet, the diffuser having a body with a tapered upstream portion, the diffuser having a plurality of blades extending outwardly from the body;
a burner elbow connected to the upstream inlet of the coal nozzle;
wherein the burner elbow defines an observation portion and the elbow comprises a flow conditioner therein, said flow conditioner resulting in a pressure drop in said elbow;
wherein the flow conditioner is adapted to direct a coal rope toward the upstream portion of the diffuser.

2. The assembly of claim 1, wherein the outer surface of the tapered upstream portion of the body of the diffuser is smoothly curved.

3. The assembly of claim 2, wherein the tapered upstream portion of the body of the diffuser is partially spherical.

4. The assembly of claim 3, wherein the body of the diffuser has a downstream portion and the plurality of the blades extend from both the tapered upstream portion and the downstream portion of the body.

5. The assembly of claim 4, wherein the tapered upstream portion has a longitudinal length and the plurality of the blades extend along at least 25 percent of the longitudinal length of the upstream portion.

6. The assembly of claim 5, wherein at least one of the blades has a tapered upstream end.

7. The assembly of claim 1, wherein at least one of the blades has a tapered downstream end.

8. The assembly of claim 1, wherein at least one of the blades has parallel upstream and downstream sidewalls.

9. The assembly of claim 8, wherein each of the sidewalls is flat.

10. The assembly of claim 8, wherein each of the sidewalls is curved.

11. The assembly of claim 1, wherein at least one of the blades has curved upstream and downstream sidewalls.

12. The assembly of claim 1, wherein at least one of the blades has at least one sidewall curved away from another sidewall to define an airfoil.

13. The assembly of claim 1, wherein the diffuser body and blades are fabricated from a ceramic metal;
wherein the diffuser has 8 to 14 blades; and wherein the blades are positioned at an angle in the range of 16 to 45° with respect to the longitudinal direction of the coal nozzle to provide each blade with an impingement surface such that a coal and air flow passing through the diffuser will be swirled, wherein the swirling motion through coal nozzle imparts centrifugal forces on the coal particles forcing them to an outside perimeter of the coal nozzle.

14. The assembly of claim 1, wherein the flow conditioner has a flat bottom and is mounted into a burner elbow inspection port; and wherein the flow conditioner includes a fixed portion and an adjustable portion, the adjustable portion being selectively movable for rotation between 0° and 90° on an angle adjustment plate with respect to the burner elbow to adjust the pressure drop across the burner elbow and fuel flow.

15. A coal nozzle assembly for a pulverized coal burner, the coal nozzle assembly comprising:

a coal nozzle having an upstream inlet and a downstream outlet, the coal nozzle having a wall having an inner surface;

a burner elbow disposed upstream of the upstream inlet wherein the elbow comprises an adjustable flow conditioner therein, the adjustable flow conditioner resulting in a pressure drop in said elbow;

a diffuser positioned in the coal nozzle closer to the upstream inlet than the downstream outlet, the diffuser having a body with a tapered upstream portion, the diffuser having a plurality of angled blades extending outwardly from the body; and the adjustable flow conditioner having a fixed portion and a moveable portion, the fixed portion being adapted to direct a coal rope into the tapered upstream portion of the diffuser and the moveable portion being selectively movable for rotation between 0° and 90° on an angle adjustment plate to adjust the pressure drop across the burner elbow.

16. The assembly of claim 15, wherein the tapered upstream portion is semi-spherical.

17. The assembly of claim 15, wherein the body of the diffuser has a downstream portion; the plurality of the blades extending from both the tapered upstream portion and the downstream portion of the body.

18. The assembly of claim 15, wherein the tapered upstream portion has a longitudinal length; a plurality of the blades extending along at least 25 percent of the longitudinal length of the upstream portion.

19. The assembly of claim 15, wherein at least one of the blades has a tapered downstream end.

20. The assembly of claim 15, wherein at least one of the blades has parallel upstream and downstream sidewalls.

21. The assembly of claim 15, wherein at least one of the blades has curved upstream and downstream sidewalls.

22. The assembly of claim 15, wherein at least one of the blades has at least one sidewall curved away from another sidewall to define an airfoil.

23. The assembly of claim 15, wherein the diffuser has 8 to 14 blades, the blades being angled at an angle in the range of 16 to 45° with respect to the longitudinal direction of the coal nozzle, the blades being adapted to spin a flow of air and coal, wherein the spinning motion through coal nozzle imparts centrifugal forces on the coal particles forcing them to an outside perimeter of the coal nozzle.

24. The assembly of claim 15, wherein the adjustable flow conditioner has a flat bottom and is mounted into a burner elbow inspection port.

25. The assembly of claim 15, wherein adjusting the pressure drop through the coal nozzle assembly allows the delivery of primary air/pulverized coal flow to be adjusted.

* * * * *